United States Patent
Kubota

(10) Patent No.: US 11,137,740 B2
(45) Date of Patent: Oct. 5, 2021

(54) NUMERICAL CONTROLLER AND METHOD FOR DETERMINING LOOK-AHEAD VARIABLE

(71) Applicant: FANUC CORPORATION, Yamanashi (JP)

(72) Inventor: Tooru Kubota, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 252 days.

(21) Appl. No.: 16/531,335

(22) Filed: Aug. 5, 2019

(65) Prior Publication Data

US 2019/0354079 A1 Nov. 21, 2019

Related U.S. Application Data

(62) Division of application No. 15/622,296, filed on Jun. 14, 2017, now Pat. No. 10,416,652.

(30) Foreign Application Priority Data

Jun. 15, 2016 (JP) .................................. 2016-118749

(51) Int. Cl.
*G05B 19/408* (2006.01)
(52) U.S. Cl.
CPC .. *G05B 19/408* (2013.01); *G05B 2219/35386* (2013.01)
(58) Field of Classification Search
None
See application file for complete search history.

(56) References Cited

U.S. PATENT DOCUMENTS

| | | | |
|---|---|---|---|
| 4,118,771 A | 10/1978 | Pomella | |
| 5,491,625 A | 2/1996 | Pressnall | |
| 6,289,264 B1* | 9/2001 | Zenke | G06F 11/3636 29/712 |
| 7,123,974 B1 | 10/2006 | Hamilton | |

(Continued)

FOREIGN PATENT DOCUMENTS

| | | |
|---|---|---|
| JP | 8278806 A | 10/1996 |
| JP | 2000242319 A | 9/2000 |

(Continued)

OTHER PUBLICATIONS

English Abstract for Japanese Publication No. 4271248 B2, published Jun. 3, 2009, 2 pgs.

(Continued)

*Primary Examiner* — Bernard G Lindsay
(74) *Attorney, Agent, or Firm* — Fredrikson & Byron, P.A.

(57) ABSTRACT

A numerical controller is equipped with an access unit configured to access variables included within a machining program at a time of analyzing the machining program, a look-ahead determining unit configured to determine whether or not the variables accessed by the access unit were accessed during look-ahead of the machining program, a specific variable determining unit configured to determine whether or not the variables determined to have been accessed during look-ahead by the look-ahead determining unit are specific variables, and an output unit configured to output at least one of numbers of the specific variables accessed during look-ahead and a time of accessing the specific variables during look-ahead, in the event that the variables accessed during look-ahead are determined to be the specific variables by the specific variable determining unit.

4 Claims, 9 Drawing Sheets

(56) References Cited

U.S. PATENT DOCUMENTS

| | | | |
|---|---|---|---|
| 2006/0229761 A1* | 10/2006 | Kita | G05B 19/4068 |
| | | | 700/181 |
| 2008/0294877 A1 | 11/2008 | Haga | |
| 2014/0088755 A1 | 3/2014 | Naga | |
| 2015/0346714 A1 | 12/2015 | Takahashi | |
| 2016/0124795 A1* | 5/2016 | Shimizu | G06F 11/0703 |
| | | | 714/37 |
| 2017/0068229 A1 | 3/2017 | Yaoita | |
| 2017/0308053 A1 | 10/2017 | Kunimoto | |

FOREIGN PATENT DOCUMENTS

| JP | 200840542 A | 2/2008 |
|---|---|---|
| JP | 4271248 B2 | 6/2009 |

OTHER PUBLICATIONS

English Abstract and Machine Translation for Japanese Publication No. 2008-040542 A, published Feb. 21, 2008, 12 pgs.
English Abstract and Machine Translation for Japanese Publication No. 08-278806 A, published Oct. 22, 1996, 8 pgs.
English Abstract and Machine Translation for Japanese Publication No. 2000-242319 A, published Sep. 8, 2000, 9 pgs.
Untranslated Decision to Grant a Patent mailed by Japan Patent Office (JPO) for Application No. JP 2016-118749, dated Aug. 28, 2018, 3 pages.
English machine translation of Decision to Grant a Patent mailed by Japan Patent Office (JPO) for Application No. JP 2016-118749, Aug. 28, 2018, 3 pages.

* cited by examiner

| VARIABLE NUMBER | ACCESSED DURING LOOK-AHEAD? | TIME |
|---|---|---|
| ⋮ | ⋮ | ⋮ |
| #100 | ○ | - |
| #100 | ○ | - |
| #10000 | × | - |
| #100 | ○ | - |
| ⋮ | ⋮ | ⋮ |

FIG. 7

| VARIABLE NUMBER | INFORMATION OF ACCESS UNITS | TIME |
|---|---|---|
| #20000 | AUTOMATIC OPERATION | 15:00:00.000 |
| #20000 | PREDETERMINED PROCESS | 15:00:05.000 |
| ⋮ | ⋮ | ⋮ |
| #20000 | PREDETERMINED PROCESS | 15:00:05.010 |
| #20000 | AUTOMATIC OPERATION | 15:00:05.014 |
| ⋮ | ⋮ | ⋮ |

NUMERICAL CONTROLLER AND METHOD FOR DETERMINING LOOK-AHEAD VARIABLE

CROSS-REFERENCE TO RELATED APPLICATION

This is a divisional application of U.S. application Ser. No. 15/622,296, filed Jun. 14, 2017, which claims the benefit of priority from Japanese Patent Application No. 2016-118749 filed on Jun. 15, 2016, the contents of which are incorporated herein by reference.

BACKGROUND OF THE INVENTION

Field of the Invention

The present invention relates to a numerical controller having a look-ahead pausing function of a machining program as well as to a variable determining method used in the numerical controller.

Description of the Related Art

In a numerical controller, there are executed in parallel a look-ahead process of reading out and analyzing a machining program (NC program) block-by-block and storing the analysis results (execution data) therefor in a look-ahead buffer, and an execution process of executing the analysis results (execution data) that are stored in the look-ahead buffer.

For this reason, a time lag occurs between the timing of the look-ahead process and the timing of the execution process, and consequently, there are cases in which erroneous machining takes place. Problems that occur due to such a time lag will briefly be described below, taking as an example a case in which the machining program shown in FIG. 8 is looked ahead block-by-block, and then an execution process is performed using the machining program. The machining program shown in FIG. 8 is made up from a plurality of blocks N10, N20, N30, N40 . . . .

As shown in FIG. 9, look-ahead and execution processes are carried out on these plural blocks at a given schedule in order of, for example, N10→N20→N30→N40 . . . . The N40 block includes a variable therein (indicated by the variable number "#5041") for acquiring an X-axis coordinate value, and after execution of the N20 block, the X-axis coordinate value is acquired, whereupon the X-axis is made to undergo movement. As shown in FIG. 9, as a result of the time lag, since the N20 block is undergoing execution when the look-ahead process (analysis, etc.) of the block N40 is being carried out, the X-axis coordinate value is acquired during execution of the N20 block, and mistaken machining is conducted.

In order to solve this type of problem, in Japanese Patent No. 4271248, there is disclosed a numerical controller having a look-ahead pausing function. To provide a simple explanation thereof, before a block having variables therein which must not be accessed during look-ahead, there is inserted a block having a code for pausing the look-ahead process, and when this code is detected, the look-ahead process of the block is temporarily stopped or paused, and the look-ahead process is resumed after execution of the preceding block is completed.

SUMMARY OF THE INVENTION

However, in the aforementioned Japanese Patent No. 4271248, the creator or designer of the program has to designate all of the variables for which the look-ahead pausing function will be required, and to input codes for implementing the look-ahead pausing. Therefore, there are cases in which mistakes may occur by the designer or the like in relation to inputting of codes for pausing look-ahead, or in designating the variables for which look-ahead is to be paused. Further, even if mistakes occur in designation of variables or in inputting of codes, discovery of such mistakes is difficult.

Thus, the present invention has the object of providing a numerical controller as well as a variable determining method, which enables such mistakes to be discovered, even in the case that mistakes occur by a program designer or the like in relation to inputting of codes for pausing look-ahead, or in designating the variables for which look-ahead is to be paused.

A first aspect of the present invention is characterized by a numerical controller configured to look ahead and analyze a machining program, comprising an access unit configured to access a variable included within the machining program at a time of analyzing the machining program, a look-ahead determining unit configured to determine whether or not the variable accessed by the access unit was accessed during look-ahead of the machining program, a specific variable determining unit configured to determine whether or not the variable determined to have been accessed during look-ahead by the look-ahead determining unit is a specific variable, and an output unit configured to output at least one of number of the specific variable accessed during look-ahead and a time at which the specific variable was accessed during look-ahead, in an event that the variable accessed during look-ahead is determined to be the specific variable by the specific variable determining unit.

In the numerical controller according to the first aspect of the present invention, the numerical controller may be configured to look ahead and analyze in order a plurality of blocks that make up the machining program, and thereafter, execute the blocks, and the access unit may be configured to access the variable that is included within the blocks at a time of analyzing the blocks.

In the numerical controller according to the first aspect of the present invention, in an event there is a block being looked ahead which has not yet been executed, and in a case that the access unit has accessed the variable, the look-ahead determining unit may be configured to determine that the variable is accessed during look-ahead of the machining program.

In the numerical controller according to the first aspect of the present invention, the specific variable may be a variable accessed by the access unit when number of blocks being looked ahead which have not yet been executed is zero.

In the numerical controller according to the first aspect of the present invention, the specific variable may be a predetermined variable.

In the numerical controller according to the first aspect of the present invention, there may further be provided an access information storage processor configured to store as access information at least the number of the variable accessed by the access unit, the time at which the variable was accessed, and a determination result of the look-ahead determining unit, wherein, on a basis of the access information, the specific variable determining unit may be configured to determine whether or not the variable determined to have been accessed during look-ahead is the specific variable.

In the numerical controller according to the first aspect of the present invention, the output unit may be configured to output to a display unit or an external device at least one of number of the specific variable accessed during look-ahead and the time at which the specific variable was accessed during look-ahead.

A second aspect of the present invention is characterized by a numerical controller configured to perform an automatic operation by executing a machining program after look-ahead and analyzing the machining program, together with carrying out a predetermined process apart from the automatic operation by executing a predetermined program in parallel with the automatic operation, wherein the machining program and the predetermined program contain a same variable, comprising a first access unit configured to access the variable included within the machining program at a time of analyzing the machining program, a second access unit configured to access the variable included within the predetermined program at a time of executing the predetermined program, a specific variable determining unit which, in an event that the first access unit and the second access unit have accessed the same variable within a predetermined time period, is configured to determine that the variable accessed during the predetermined time period is a specific variable, and an output unit configured to output at least one of number of the variable determined to be the specific variable by the specific variable determining unit, and times at which the first access unit and the second access unit have accessed the variable determined to be the specific variable.

In the numerical controller according to the second aspect of the present invention, there may further be provided an access information storage processor configured to store as access information at least the number of the variable accessed by the first access unit, the time at which the variable was accessed by the first access unit, and information of the first access unit, the number of the variable accessed by the second access unit, the time at which the variable was accessed by the second access unit, and information of the second access unit, wherein, on a basis of the access information, the specific variable determining unit may be configured to determine whether or not the variable is the specific variable.

In the numerical controller according to the second aspect of the present invention, the output unit may be configured to output to a display unit or an external device at least one of the number of the variable determined to be the specific variable, and the times at which the first access unit and the second access unit have accessed the variable determined to be the specific variable.

A third aspect of the present invention is characterized by a variable determining method which is used in a numerical controller configured to look ahead and analyze a machining program, comprising an accessing step of accessing a variable included within the machining program at a time of analyzing the machining program, a look-ahead determining step of determining whether or not the accessed variable was accessed during look-ahead of the machining program, a specific variable determining step of determining whether or not the variable determined to have been accessed during look-ahead is a specific variable, and an outputting step of outputting at least one of number of the specific variable accessed during look-ahead and a time of accessing the specific variable during look-ahead, in an event that the variable accessed during look-ahead is determined to be the specific variable.

A fourth aspect of the present invention is characterized by a variable determining method which is used in a numerical controller configured to perform an automatic operation by executing a machining program after look-ahead and analyzing the machining program, together with carrying out a predetermined process apart from the automatic operation by executing a predetermined program in parallel with the automatic operation, wherein the machining program and the predetermined program contain a same variable, comprising a first accessing step of accessing the variable included within the machining program at a time of analyzing the machining program, a second accessing step of accessing the variable included within the predetermined program at a time of executing the predetermined program, a specific variable determining step of, in an event that the first accessing step and the second accessing step have accessed the same variable within a predetermined time period, determining that the variable accessed during the predetermined time period is a specific variable, and an outputting step of outputting at least one of number of the variable determined to be the specific variable, and times at which the first accessing step and the second accessing step have accessed the variable determined to be the specific variable.

According to the present invention, it is possible to easily discover mistakes, even in the case that mistakes occur by a program designer or the like in relation to inputting of codes for pausing look-ahead, or in designating the variables for which look-ahead is to be paused.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 1 is a view showing a machining program used in a first embodiment;

FIG. 4 is a view showing an example of access information stored in chronological order by an access information storage processor shown in FIG. 3;

FIG. 7 is a view showing an example of access information stored in chronological order by an access information storage processor shown in FIG. 5;

FIG. 8 is a view showing a machining program used for the purpose of describing the conventional technology.

DESCRIPTION OF THE PREFERRED EMBODIMENTS

Preferred embodiments concerning a numerical controller and a variable determining method according to the present invention will be presented and described in detail below with reference to the accompanying drawings.

First Embodiment

Figure 2:
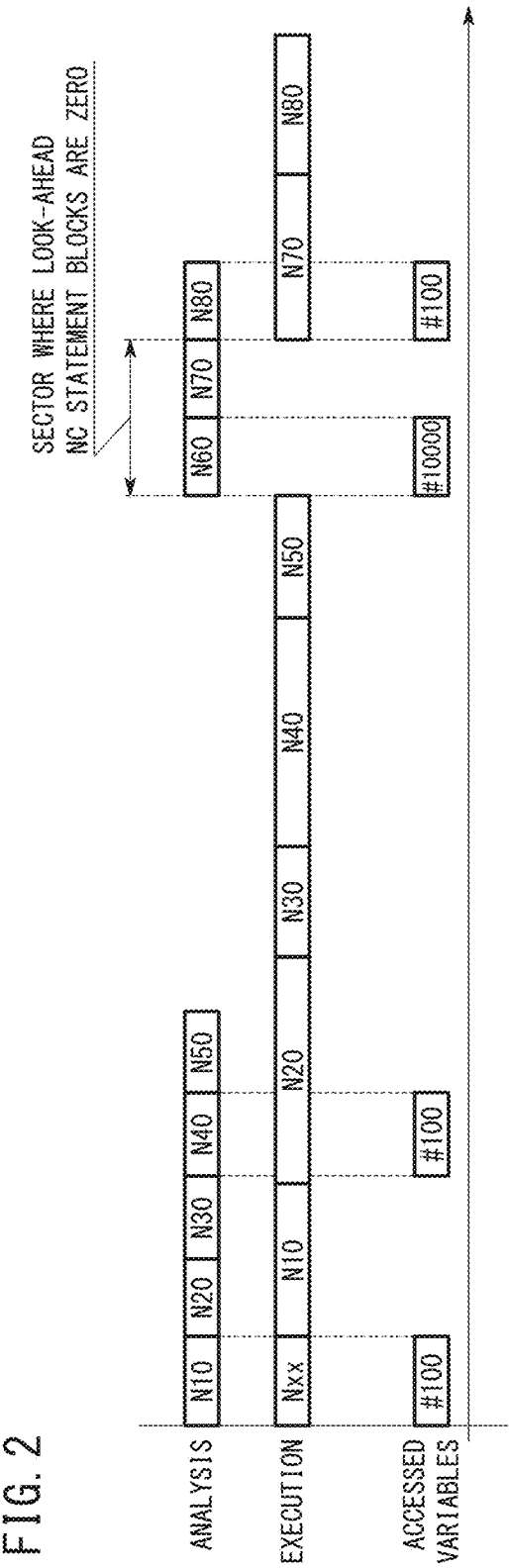
FIG. 2 is a view showing a timing chart of an analytical process and an execution process of the machining program shown in FIG. 1.

Initially, a description will be made concerning analysis of a machining program and execution of the machining program by a numerical controller 10 that controls a machine tool. FIG. 1 is a view showing an example of the machining program, and FIG. 2 is a view showing a timing chart of an analytical process and an execution process of the machining program shown in FIG. 1. The analysis and execution are performed by the numerical controller 10 shown in FIG. 3.

The machining program shown in FIG. 1 is made up from a plurality of blocks N10, N20, N30 . . . N70, N80 . . . . The N10 block, the N40 block, and the N80 block include variables having the variable number "#100", and the N60 block includes a variable having the variable number "#10000". Since the N60 block includes a variable (variable number "#10000") that should not be accessed during look-ahead, before the N60 block, the N50 block is provided that includes a code therein to control (i.e., to pause) look-ahead. The variable of variable number "#10000" is a variable whose value changes in accordance with the state of the machine tool at a time that the variable is accessed. In other words, the variable of variable number "#10000" is overwritten upon being accessed.

Analysis of the blocks takes place sequentially from the leading (top) block. Execution data is created by analysis of the blocks, and processes are executed on the basis of such execution data. In the present description, execution of the processes based on the execution data obtained by analysis of the blocks may sometimes be referred to as execution of the blocks. For example, the phrase "execute block N10" or "execution of block N10" implies that a process is executed on the basis of the execution data obtained by analysis of the N10 block.

Moreover, since the N10 through N50, N70 and N80 blocks shown in FIG. 1 are NC statements, execution data is created by analyzing the blocks, and processes are executed on the basis of such execution data. However, in relation to blocks (for example, the N60 block) which are defined by features other than NC statements, only look-ahead and analysis thereof are carried out. Such blocks are not executed, and execution data are not created therefor. The blocks having NC statements imply blocks that directly influence operations of the machine tool as an object to be controlled by the numerical controller 10, such as axis movement commands or auxiliary functions thereof, etc. Consequently, blocks that do not have NC statements therein are blocks that do not directly influence operations of the machine tool, such as assignment or reference to variables or a program conditional branch or the like.

Upon completion of analysis of the leading (top) block, execution is initiated in order from the leading block. In principle, analyses of the blocks are executed sequentially with look-ahead taking place prior to execution of the blocks. Stated otherwise, since the processing time for analysis of the blocks is shorter than the processing time for execution of the blocks, analysis of the blocks (look-ahead) is performed prior to execution of the blocks. Therefore, as shown in FIG. 2, during the time that the N40 and N50 blocks are being analyzed, the N20 block is still undergoing execution.

In this instance, as shown in FIG. 1, between the N40 block and the N60 block, the N50 block is provided, which contains a code to control (i.e., to pause) look-ahead, and therefore, further look-ahead is paused when the analysis by look-ahead of the N50 block is completed. In addition, when execution of the N50 block is completed, analysis of the N60 block and blocks thereafter is resumed. Stated otherwise, following completion of the analysis of the N50 block by look-ahead, and during the period until completion of execution of the N50 block, analysis of the blocks is paused by the N50 block.

Due to an input mistake of a creator or program designer (hereinafter referred to as a designer), in the case it is forgotten to input a block containing code to suppress look-ahead before a block that has variables therein that should not be accessed during look-ahead, it is not possible to appropriately perform machining in accordance with an automatic operation. Thus, according to the first embodiment, even in the case it is forgotten to input a block containing code to suppress look-ahead before a block that has variables therein that should not be accessed during look-ahead, it is possible to discover such a mistake.

Figure 3:
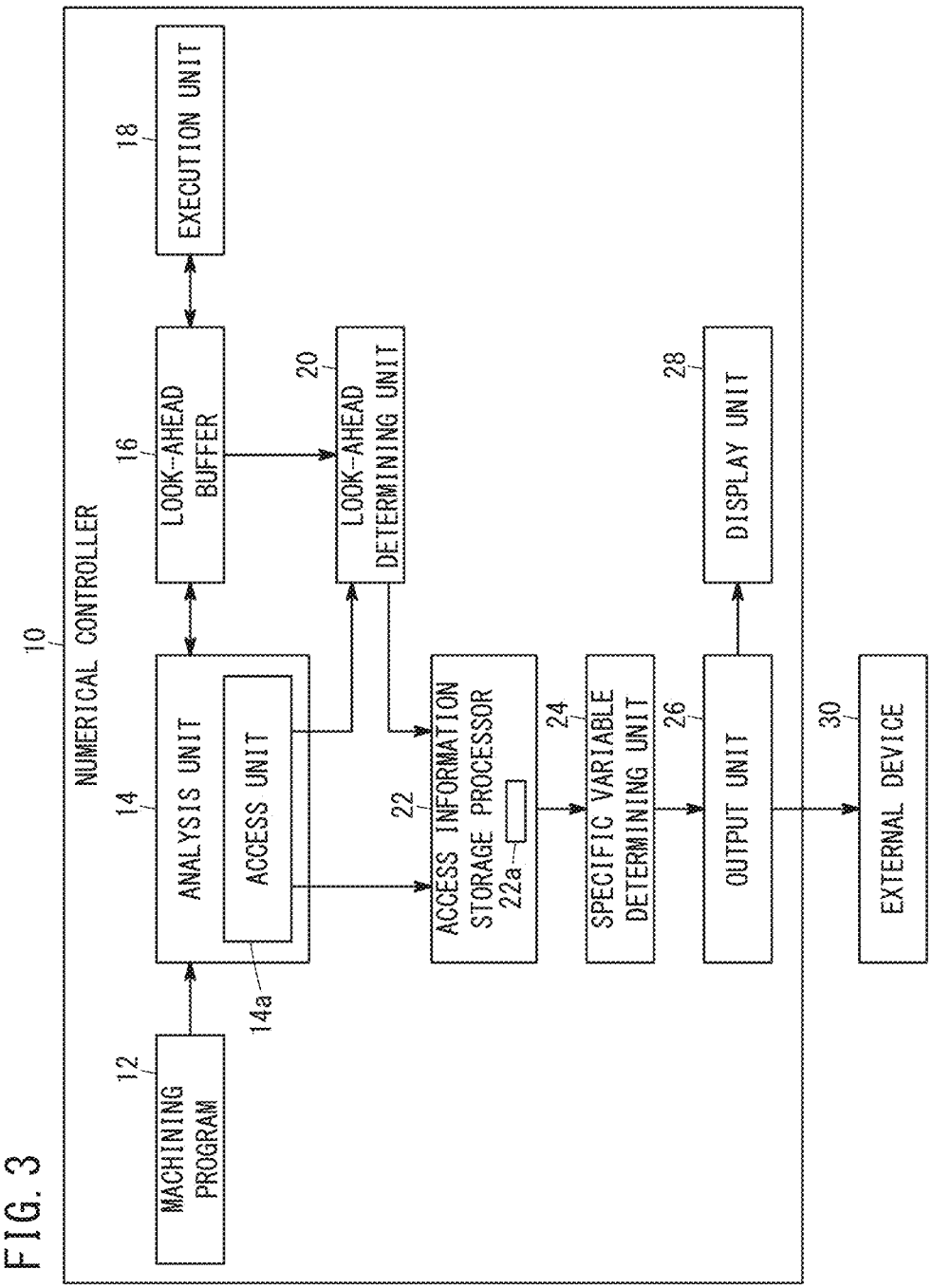
FIG. 3 is a functional block diagram showing the configuration of a numerical controller of the first embodiment.

FIG. 3 is a functional block diagram showing the configuration of the numerical controller 10 of the first embodiment. The numerical controller 10 is constituted by a computer having a CPU and a memory, and by the CPU executing a program stored in the memory, the computer functions as the numerical controller 10 according to the first embodiment. The numerical controller 10 is equipped with a machining program 12, an analysis unit 14, a look-ahead buffer 16, an execution unit 18, a look-ahead determining unit 20, an access information storage processor 22, a specific variable determining unit 24, an output unit 26, and a display unit 28. Moreover, an external device 30 is capable of communicating wirelessly or over wires with the output unit 26.

The machining program 12 is stored in a storage medium such as a memory or the like that constitutes hardware of the numerical controller 10. The machining program 12 is a program to carry out machining with respect to an object to be machined in accordance with an automatic operation. The machining program 12 has the same content as that shown in FIG. 1.

The analysis unit 14 analyzes the machining program 12 before execution of the machining program 12. Among the plurality of blocks that make up the machining program 12, the analysis unit 14 looks ahead (pre-reads or reads in advance) and analyzes the blocks sequentially in order from the leading block. The analysis unit 14 includes an access unit 14a that accesses the variables included within the blocks at a time of analyzing the blocks. The access unit 14a accesses the variables having the variable number "#100" at a time of analyzing the N10, N40, and N80 blocks, and accesses the variable having the variable number "#10000" at a time of analyzing the N60 block (see FIG. 1).

When the N50 block containing the code to control (i.e., to pause) look-ahead is read in and analyzed, the analysis unit 14 pauses analysis of the next block and blocks thereafter (the N60 block and blocks thereafter) until execution of the N50 block comes to an end. By analyzing the blocks, the blocks which are in the form of source code are converted into object code that can be recognized by the computer, and execution data is created. In the case that blocks having NC statements are analyzed, the analysis unit 14 creates execution data using the variables that were accessed by the access unit 14a. In relation to blocks that are not made up of NC statements, creation of execution data is not carried out.

The analysis unit 14 stores the analysis results (execution data) in the look-ahead buffer 16. Because the analysis unit 14 carries out analyses in order from the leading block of the machining program 12, the analysis results therefor are stored in order from the leading block in the look-ahead buffer 16.

The execution unit 18 performs the execution process on the basis of the execution data of the blocks that are stored in the look-ahead buffer 16. Consequently, the machine tool that serves as the control object of the numerical controller 10 is operated. The execution unit 18 deletes from the look-ahead buffer 16 execution data of the blocks for which execution processing is completed. Consequently, in the look-ahead buffer 16, there is only stored execution data of blocks that are looked ahead but which have not yet been executed. In the event that execution data of blocks are stored in plurality in the look-ahead buffer 16, among such blocks, the execution unit 18 performs the execution process on the basis of the execution data of the foremost leading block.

When look-ahead by the analysis unit 14 is paused by the N50 block, the number of execution data of the blocks (number of look-ahead blocks) that are stored in the look-ahead buffer 16 is reduced progressively over time, and thereafter becomes zero (see FIG. 2). When the execution data of the blocks stored in the look-ahead buffer 16 becomes zero, or in other words, when the number of look-ahead blocks that have not yet been executed becomes zero, the analysis unit 14 once again starts the analysis of the next block and blocks thereafter (the N60 block and blocks thereafter). Stated otherwise, when the analysis unit 14 looks ahead and analyzes the N50 block, although analysis of the next block and blocks thereafter (the N60 block and blocks thereafter) is paused until execution of the N50 block comes to an end, the determination of whether or not execution of the N50 block has come to an end is determined by whether or not the number of execution data of the look-ahead blocks that are stored in the look-ahead buffer 16 (number of look-ahead blocks that have not yet been executed) has become zero.

The look-ahead determining unit 20 determines whether or not the variables accessed by the access unit 14*a* are variables that were accessed during look-ahead of the machining program 12. More specifically, in the case that the number of execution data of the blocks that are stored in the look-ahead buffer 16 (number of look-ahead NC statement blocks that have not yet been executed) is not zero, or in other words is greater than or equal to one, the look-ahead determining unit 20 determines that the accessed variables are variables being accessed during look-ahead. The look-ahead determining unit 20 outputs the determination result thereof to the access information storage processor 22.

The access unit 14*a* outputs to the look-ahead determining unit 20 information to the effect that access was made at the timings at which the variables were accessed, and at a timing of having received such information, the look-ahead determining unit 20 determines whether or not the variables were accessed during look-ahead. Further, the access unit 14*a* outputs to the access information storage processor 22 the numbers (variable numbers) of the accessed variables, and the times at which the variables were accessed. The numerical controller 10 includes a clock circuit for clocking or measuring the times.

The access information storage processor 22 associates and stores as access information in a storage unit (storage medium) 22*a* inside the access information storage processor 22 the numbers of the variables accessed by the access unit 14*a*, the times at which the variables were accessed, and the determination results of the look-ahead determining unit 20 (whether or not the variables were accessed during look-ahead). Each time that the access unit 14*a* accesses a variable, the access information storage processor 22 stores in chronological order as access information the number of the accessed variable, the time at which the variable was accessed, and the determination result.

FIG. 4 is a view showing an example of access information stored in chronological order by the access information storage processor 22. As shown in FIG. 4, the number (variable number) of the accessed variables, the times at which the variables were accessed, and whether or not the variables were accessed during look-ahead are associated and stored as access information. At the times that the N10, N40, and N80 blocks having the variable of variable number "#100" are analyzed, the look-ahead execution data of the blocks are stored in the look-ahead buffer 16 (number of look-ahead blocks that have not yet been executed≠0). Consequently, access to the variables of variable number "#100" takes place during look-ahead, and access during look-ahead is indicated by the "○" symbol. On the other hand, at the time that the N60 block having the variable of variable number "#10000" is analyzed, since look-ahead is being paused by the N50 block, the look-ahead execution data of the block is not stored in the look-ahead buffer 16 (number of look-ahead blocks that have not yet been executed=0). Consequently, access to the variable of variable number "#10000" takes place at a time that is not during look-ahead, and access during look-ahead is indicated by the "×" symbol.

In the foregoing manner, in principle, concerning the access information that is stored by the access information storage processor 22, in the case of the variable number "#100", access during look-ahead is indicated by the "○" symbol, whereas in the case of the variable number "#10000", access during look-ahead is indicated by the "×" symbol. However, before the block containing the variable number "#10000", in the event it is forgotten by the designer to input the block containing the code to suppress look-ahead, even in the case of the variable number "#10000", access information will be stored indicating access during look-ahead with the "○" symbol. Further, before a block containing the variable number "#100", in the event the designer mistakenly inputs the block containing the code to suppress look-ahead, even in the case of the variable number "#100", access information will be stored indicating access during look-ahead with the "×" symbol.

The specific variable determining unit 24 determines whether or not the variables determined to have been accessed during look-ahead are variables for which there is a possibility that they should not be accessed during look-ahead. The specific variable determining unit 24 carries out such a determination based on the access information stored by the access information storage processor 22. The variables for which there is a possibility that they should not be accessed during look-ahead are referred to below as specific variables. Among the access information which was stored in chronological order by the access information storage processor 22, the specific variable determining unit 24 determines as a specific variable any variable whose variable number indicates access thereof during look-ahead with the "×" symbol. As can be understood from observing FIG. 4, since the variable number "#10000" indicates access thereof during look-ahead with the "×" symbol, the variable number "#10000" is treated as a specific variable. Stated otherwise, variables determined to be specific variables are variables which are accessed by the access unit 14*a* at a time that the number of look-ahead blocks that have not yet been executed is zero.

Within the access information shown in FIG. 4, in the event there is the variable number "#10000", and access during look-ahead is indicated with the "○" symbol, a situation may occur in which a specific variable is included among the variables accessed during look-ahead. Consequently, in the case that the variable having the variable number "#10000" is included within the variables determined to have been accessed during look-ahead, the specific variable determining unit 24 determines that the variable having the variable number "#10000" indicative of being accessed during look-ahead is a specific variable. The specific variable determining unit 24 outputs to the output unit 26 at least one of the variable number "#10000" of the variable that was determined to be a specific variable and which was accessed during look-ahead, and the time at which the specific variable was accessed during look-ahead.

Although the variables having the variable number "#100" were also accessed during look-ahead, in the example shown in FIG. 4, the variables having the variable number "#100" are not determined to be specific variables. However, in the case that, due to a mistaken input of a block containing the code to suppress look-ahead, access during look-ahead of even one of the variable numbers "#100" is indicated with the "×" symbol, then the variable having the variable number "#100" will be determined to be a specific variable.

The output unit 26 outputs to the display unit 28 or the external device 30 at least one of the variable number "#10000" of the variable that was determined to be a specific variable, and the time at which the specific variable was accessed during look-ahead. The display unit 28 displays the information transmitted thereto from the output unit 26. The external device 30 may be a portable computer which can be carried by the designer (for example, a PDA or the like) having a display. Accordingly, the external device 30 is also capable of displaying information transmitted thereto from the output unit 26.

In the foregoing manner, the numerical controller 10 according to the first embodiment looks ahead and analyzes the machining program 12. The numerical controller 10 is equipped at least with the access unit 14a, the look-ahead determining unit 20, the specific variable determining unit 24, and the output unit 26. The access unit 14a accesses the variables included within the machining program 12 at a time of analyzing the machining program 12. The look-ahead determining unit 20 determines whether or not the variables accessed by the access unit 14a are variables that were accessed during look-ahead of the machining program 12. The specific variable determining unit 24 determines whether or not the variables determined to have been accessed during look-ahead by the look-ahead determining unit 20 are specific variables (variables for which there is a possibility that they should not be accessed during look-ahead). The output unit 26 outputs at least one of the numbers of the specific variables accessed during look-ahead, and the times at which the specific variables were accessed during look-ahead, in the event that the variables accessed during look-ahead are determined to be the specific variables by the specific variable determining unit 24. Consequently, it is possible to easily discover mistakes, even in the case that mistakes occur by the designer or the like in relation to inputting of codes for pausing look-ahead, or in designating the variables for which look-ahead is to be paused.

Modifications of the First Embodiment

According to the first embodiment, the specific variable determining unit 24 determines a variable, i.e., a specific variable which should not be accessed during look-ahead, on the basis of the access information. However, the specific variables may also be stored in advance in the specific variable determining unit 24. Normally, since the variables that are not accessed during look-ahead are determined in advance, by the designer operating a non-illustrated input operation unit of the numerical controller 10, the specific variables may also be stored in the specific variable determining unit 24.

Second Embodiment

Figure 5:
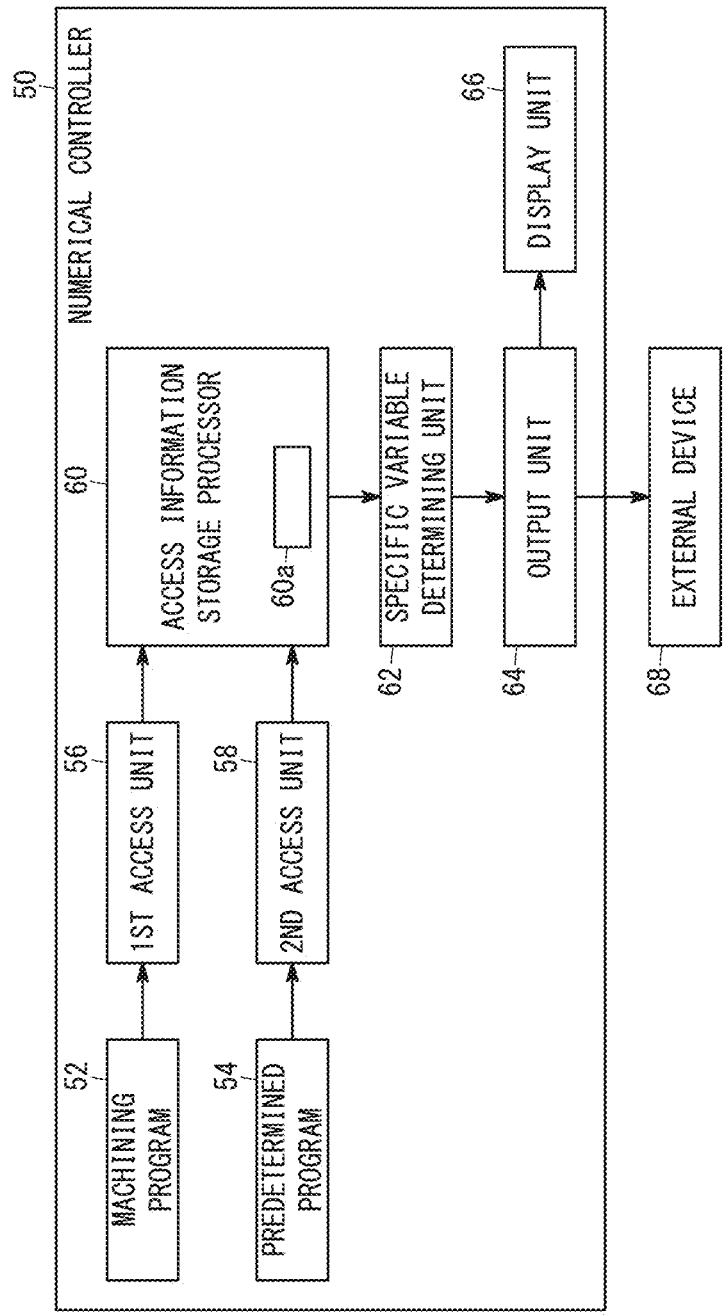
FIG. 5 is a functional block diagram showing the configuration of a numerical controller according to a second embodiment.

FIG. 5 is a functional block diagram showing the configuration of a numerical controller 50 according to a second embodiment. The numerical controller 50 is constituted by a computer having a CPU and a memory, and by the CPU executing a program stored in the memory, the computer functions as the numerical controller 50 according to the second embodiment. The numerical controller 50 is equipped with a machining program 52, a predetermined program 54, a first access unit 56, a second access unit 58, an access information storage processor 60, a specific variable determining unit 62, an output unit 64, and a display unit 66. Moreover, an external device 68 is capable of communicating wirelessly or over wires with the output unit 64.

The machining program 52 and the predetermined program 54 are stored in a storage medium such as a memory or the like that constitutes hardware of the numerical controller 50. The machining program 52 is a program to carry out machining with respect to an object to be machined in accordance with an automatic operation. The predetermined program 54 is a program for performing a predetermined process (application) other than the aforementioned automatic operation. The predetermined process (application) is carried out in parallel with the automatic operation.

In the same manner as described above in relation to the first embodiment, the first access unit 56 accesses the variables included within the machining program 52 at a time of analyzing the machining program 52. The first access unit 56 accesses the variables included within the blocks to be analyzed at a time of analyzing the blocks. The first access unit 56 includes the same functions as those of the access unit 14a described above in connection with the first embodiment. The second access unit 58 accesses the variables included within the predetermined program 54 at a time that the predetermined program 54 is executed. In the predetermined program 54, among the plurality of variables included within the machining program 52 (plural variables having different variable numbers), there are included variables which are the same as one or two or more variables having predetermined variable numbers. Below, in order to make the description easier to understand, there are common variables (same variables) that are included within the machining program 52 and the predetermined program 54, and the variables included within the machining program 52 are referred to as first variables, whereas those included within the predetermined program 54 are referred to as second variables.

The first variables are variables whose values change in accordance with the state of the machine tool at a time that the variables are accessed by the first access unit 56. When the first variables are overwritten, the values of the second variables that correspond to the first variables are changed as well. Further, when the second variables are accessed by the second access unit 58, the values of the second variables at that time are read in. The read-in values of the second variables are used for carrying out the predetermined process. According to the second embodiment, since the number of first variables is one, the number of second variables also is one, and the variable number therefor is set to "#20000".

The first access unit 56 outputs to the access information storage processor 60 the number (variable number) of the accessed first variable, the times at which the first variable was accessed, and information of the first access unit 56. The information of the first access unit 56 is information to the effect that access is made by a process of the automatic operation. The second access unit 58 outputs to the access information storage processor 60 the number (variable number) of the accessed second variable, the times at which the second variable was accessed, and information of the second access unit 58. The information of the second access unit 58 is information to the effect that access is made in accordance with the predetermined process.

The access information storage processor 60 stores as access information in a storage unit 60*a* inside the access information storage processor 60 the number of the first variable accessed by the first access unit 56, the times at which the first variable was accessed by the first access unit 56, and information of the first access unit 56. Further, the access information storage processor 60 also stores as access information in the storage unit (storage medium) 60*a* the number of the second variable accessed by the second access unit 58, the times at which the second variable was accessed by the second access unit 58, and information of the second access unit 58. Each time that the access units (first access unit 56 and second access unit 58) access a common variable (the first variable and the second variable), the access information storage processor 60 stores in chronological order as access information the number of the accessed first variable, the number of the accessed second variable, and the times at which the variables were accessed.

Figure 6:
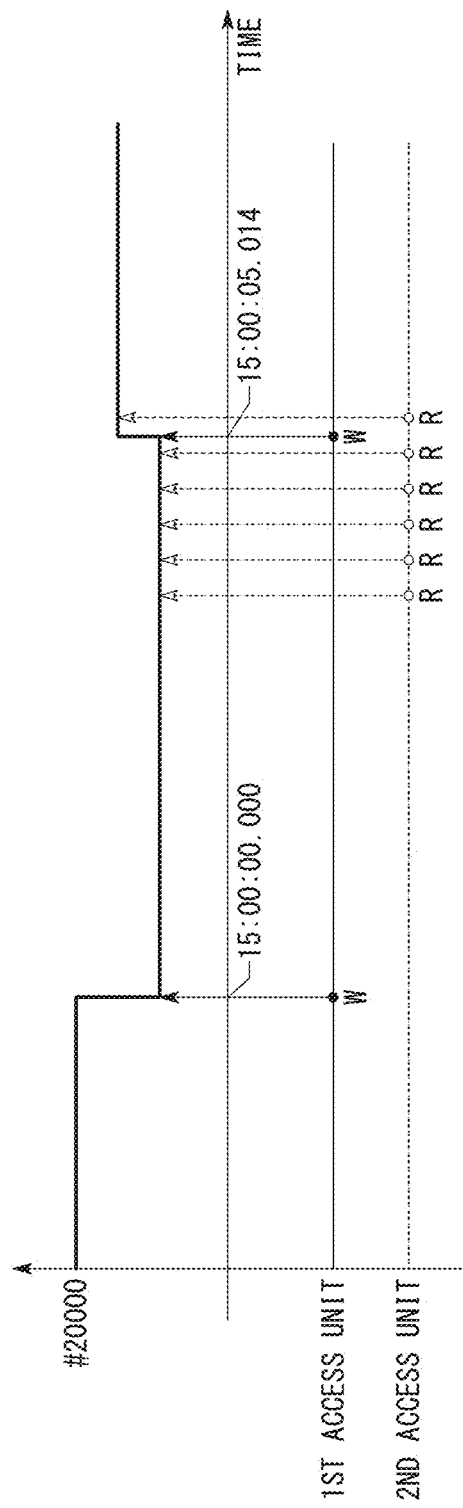
FIG. 6 is a time chart showing multiple access timings of variables by a first access unit and a second access unit shown in FIG. 5.
Figure 9:
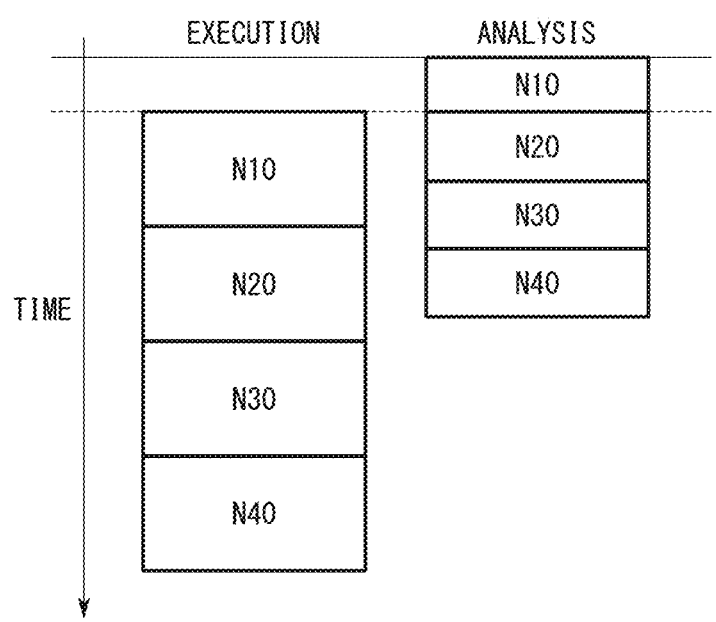
FIG. 9 is a view showing a timing chart of an analytical process and an execution process of the machining program shown in FIG. 8.

FIG. 6 is a time chart showing multiple access timings of the first variable and the second variable by the first access unit 56 and the second access unit 58. At time "15:00:00.000", the first access unit 56 accesses the first variable having the variable number "#20000", and thereafter, at time "15:00:05.014", again accesses the first variable having the variable number "#20000". The value of the first variable is overwritten at a timing (at time "15:00:00.000" and at time "15:00:05.014") at which the first variable having the variable number "#20000" was accessed by the first access unit 56.

The second access unit 58 accesses the second variable having the variable number "#20000". The value of the second variable having the variable number "#20000" is read out as a result of being accessed in this manner, and the read-out value is used in the predetermined process. In the example shown in FIG. 6, the second access unit 58 accesses the second variable at intervals which are shorter than the interval at which the first access unit 56 accesses the first variable, however, the present invention is not limited to this feature. Stated otherwise, the second access unit 58 may access the second variable at an interval which is longer than the interval at which the first access unit 56 accesses the first variable.

FIG. 7 is a view showing access information that is stored in chronological order by the access information storage processor 60, in the case that the first access unit 56 and the second access unit 58 have accessed the first variable and the second variable as shown in FIG. 6. As shown in FIG. 7, the numbers (variable numbers) of the accessed first variable and second variable, the times at which the variables were accessed, and information of the first access unit 56 or the second access unit 58 that have accessed the first variable or the second variable are associated with each other and stored as access information. According to the second embodiment, the number of the first variables and the second variables is one variable having the variable number "#20000", and therefore, all of the variable numbers of the access information are "#20000".

The specific variable determining unit 62 determines whether or not the first access unit 56 and the second access unit 58 have accessed the first variable and the second variable within a predetermined time period ΔT (for example, 10 msec). In other words, a determination is made as to whether or not the plural access units (56, 58) have accessed the same variable (first variable=second variable) within the predetermined time period ΔT. If it is determined that the first variable and the second variable have been accessed within the predetermined time period ΔT, the specific variable determining unit 62 determines that the first variable and the second variable, which were accessed within the predetermined time period ΔT, are specific variables. The term specific variable implies a variable that should not be accessed during look-ahead.

As shown in FIG. 7, at time "15:00:05.010", the second variable having the variable number "#20000" is accessed by the second access unit 58, and at time "15:00:05.014", the first variable having the variable number "#20000" is accessed by the first access unit 56. From the fact that the difference between the time "15:00:05.010" and the time "15:00:05.014" lies within the predetermined time period ΔT (for example, 10 msec), the specific variable determining unit 62 determines that the first variable and the second variable having the variable number "#20000" are specific variables. The specific variable determining unit 62 outputs to the output unit 64 at least one of the variable numbers "#20000" of the first variable and the second variable that were determined to be specific variables, and the times at which the first variable and the second variable, which were determined to be specific variables, were accessed.

The output unit 64 outputs to the display unit 66 or the external device 68 at least one of the variable numbers "#20000" of the first variable and the second variable that were determined to be specific variables, and the times at which the variables of the first variable and the second variable, which were determined to be specific variables, were accessed. The display unit 66 displays the information transmitted thereto from the output unit 64. The external device 68 may be a portable computer which can be carried by the designer (for example, a PDA or the like) having a display. Accordingly, the external device 68 is also capable of displaying information transmitted thereto from the output unit 64. Moreover, the output unit 64 may also output to the display unit 66 or the external device 68 information of the first access unit 56 and the second access unit 58 which accessed the specific variables.

In the foregoing manner, the numerical controller 50 according to the second embodiment carries out look-ahead and analysis of the machining program 52, and thereafter, carries out an automatic operation by executing the machining program 52, and together therewith, in parallel with the automatic operation, executes the predetermined program 54 and performs a predetermined process other than the automatic operation. The numerical controller 50 is equipped at least with the first access unit 56, the second access unit 58, the specific variable determining unit 62, and the output unit 64. The machining program 52 and the predetermined program 54 contain a same variable. The first access unit 56 accesses the variables included within the machining program 52 at a time of analyzing the machining program 52. The second access unit 58 accesses the variables included within the predetermined program 54 at a time that the predetermined program 54 is executed. In the case that the first access unit 56 and the second access unit 58 have accessed the same variable within the predetermined time period ΔT, the specific variable determining unit 62 determines that the variables accessed within the predetermined time period ΔT are specific variables. The output unit 64 outputs at least one of the numbers of the variables determined to be specific variables by the specific variable determining unit 62, and the time at which the first access unit 56 and the second access unit 58 have accessed the variables determined to be specific variables. Consequently, it is possible to easily discover mistakes, even in the case that mistakes occur by the designer in relation to inputting of codes for pausing look-ahead, or in designating the variables for which look-ahead is to be paused.

In the second embodiment, in order to facilitate the description thereof, although an exemplary description was presented of a case of one predetermined process carried out in parallel with the automatic operation, the second embodiment can also be applied to a case in which a plurality of mutually different predetermined processes are performed in parallel with the automatic operation. In this case, a plurality of second access units 58 are provided in a number corresponding to the number of predetermined processes.

The numerical controller and variable determining method according to the present invention are not limited to the above embodiments, and it is a matter of course that various additional or modified structures could be adopted therein without departing from the scope of the invention as set forth in the appended claims.

What is claimed is:

1. A numerical controller constituted by a computer configured to look ahead and analyze a machining program for controlling a machine tool, the numerical controller, comprising:
    an access unit configured to access a variable included within the machining program at a time of analyzing the machining program;
    a look-ahead determining unit configured to determine whether or not the variable accessed by the access unit was accessed during look-ahead of the machining program;
    a specific variable determining unit configured to determine whether or not the variable determined to have been accessed during look-ahead by the look-ahead determining unit is a specific variable; and
    an output unit configured to output to a user at least one of a number corresponding to the specific variable accessed during look-ahead or a time at which the specific variable was accessed during look-ahead, in an event that the variable accessed during look-ahead is determined to be the specific variable by the specific variable determining unit, wherein the numerical controller is configured to look ahead and analyze in order a plurality of blocks that make up the machining program, and thereafter, execute the blocks; and
    the access unit is configured to access the variable that is included within the blocks at a time of analyzing the blocks, wherein the specific variable is a predetermined variable included in a next block to be accessed by the access unit when the number of blocks being looked ahead prior to the next block which have not yet been executed is zero.

2. The numerical controller according to claim 1, further comprising an access information storage processor configured to store as access information at least the number of the variable accessed by the access unit, the time at which the variable was accessed, and a determination result of the look-ahead determining unit;
    wherein, on a basis of the access information, the specific variable determining unit is configured to determine whether or not the variable determined to have been accessed during look-ahead is the specific variable.

3. The numerical controller according to claim 1, wherein the output unit is configured to output to a display unit or an external device at least one of number of the specific variable accessed during look-ahead or the time at which the specific variable was accessed during look-ahead.

4. A variable determining method which is used in a numerical controller constituted by a computer configured to look ahead and analyze a machining program for controlling a machine tool, the numerical controller, comprising:
    an accessing step of accessing a variable included within the machining program at a time of analyzing the machining program and accessing the variable that is included within the blocks at a time of analyzing the blocks;
    a look-ahead determining step of determining whether or not the accessed variable was accessed during look-ahead of the machining program and configured to look ahead and analyze in order a plurality of blocks that make up the machining program, and thereafter, execute the blocks;
    a specific variable determining step of determining whether or not the variable determined to have been accessed during look-ahead is a specific variable; and
    an outputting step of outputting to a user at least one of a number corresponding to the specific variable accessed during look-ahead or a time of accessing the specific variable during look-ahead, in an event that the variable accessed during look-ahead is determined to be the specific variable, wherein the specific variable is a predetermined variable included in a next block to be accessed by the access unit when the number of blocks being looked ahead prior to the next block which have not yet been executed is zero.

\* \* \* \* \*